United States Patent
Newcomer

(10) Patent No.: US 7,932,619 B2
(45) Date of Patent: Apr. 26, 2011

(54) FREE RENEWABLE ENERGY DESIGNS

(76) Inventor: Fred Michael Newcomer, Columbia Falls, ME (US)

( * ) Notice: Subject to any disclaimer, the term of this patent is extended or adjusted under 35 U.S.C. 154(b) by 165 days.

(21) Appl. No.: 12/291,867

(22) Filed: Nov. 15, 2008

(65) Prior Publication Data

US 2010/0066090 A1    Mar. 18, 2010

(51) Int. Cl.
  *F03B 13/10* (2006.01)
(52) U.S. Cl. ......................................................... 290/53
(58) Field of Classification Search .................... 290/43, 290/44, 53, 54, 55
  See application file for complete search history.

(56) References Cited

U.S. PATENT DOCUMENTS

| | | | |
|---|---|---|---|
| 6,791,206 B1 * | 9/2004 | Woodbridge | 290/53 |
| 7,453,164 B2 * | 11/2008 | Borden et al. | 290/42 |
| 7,525,212 B1 * | 4/2009 | Catlin | 290/53 |

* cited by examiner

Primary Examiner — J Gon
Assistant Examiner — Iraj A Mohandesi

(57) ABSTRACT

These Free Renewable Energy Designs capture the Earth's tidal energy forces. These systems of interconnected modules are capable of capturing and releasing massive amounts of sea water through water control gate(s) located on the barges. Type A design modules are permanently suspended between high tide and low tide levels and converts Earth's tidal energy into electricity by means of bidirectional water driven turbines contained within cylindrical housings located adjacent to the watertight control gate(s), and at the internal connections between the individual modules, and by bidirectional air driven turbines on the air pressure relief vents. Type B design modules are dynamically secured against massive columns with foundations, and are capable of moving freely up and down the columns, thus using gravitational kinetic energy and buoyant kinetic energy to mechanically drive electrical generators between tidal changes. They also incorporate bidirectional water and air driven electrical turbines, which are activated during the "fill" and "empty" cycles of the system just prior to high and low tides.

1 Claim, 4 Drawing Sheets

FIGURE 1
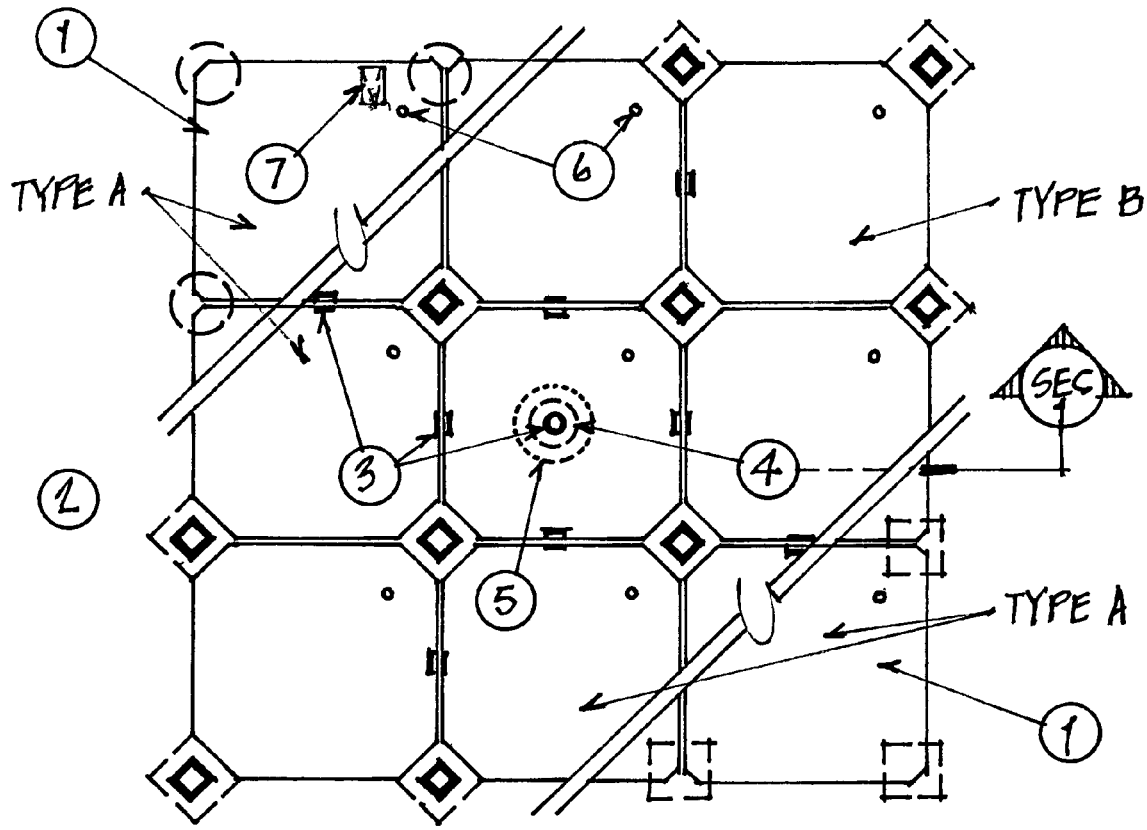
PLAN
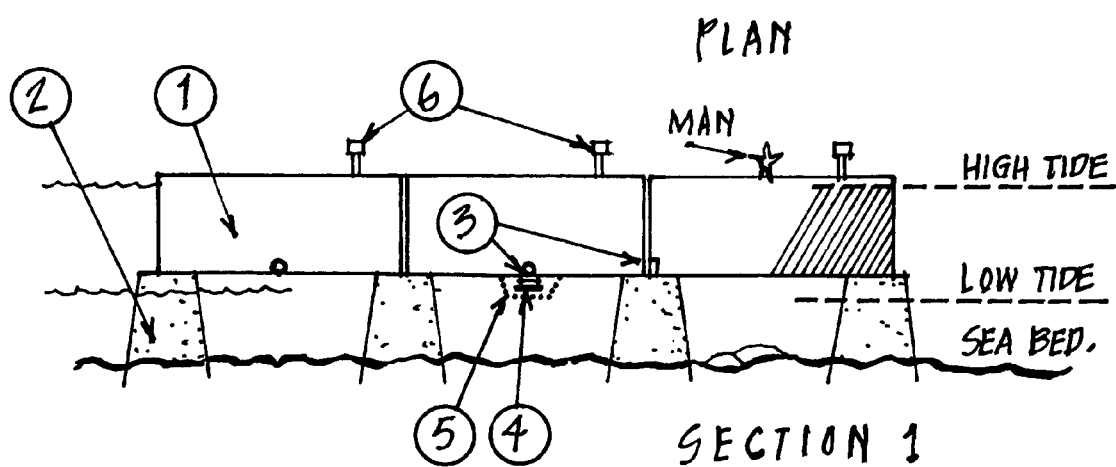
SECTION 1

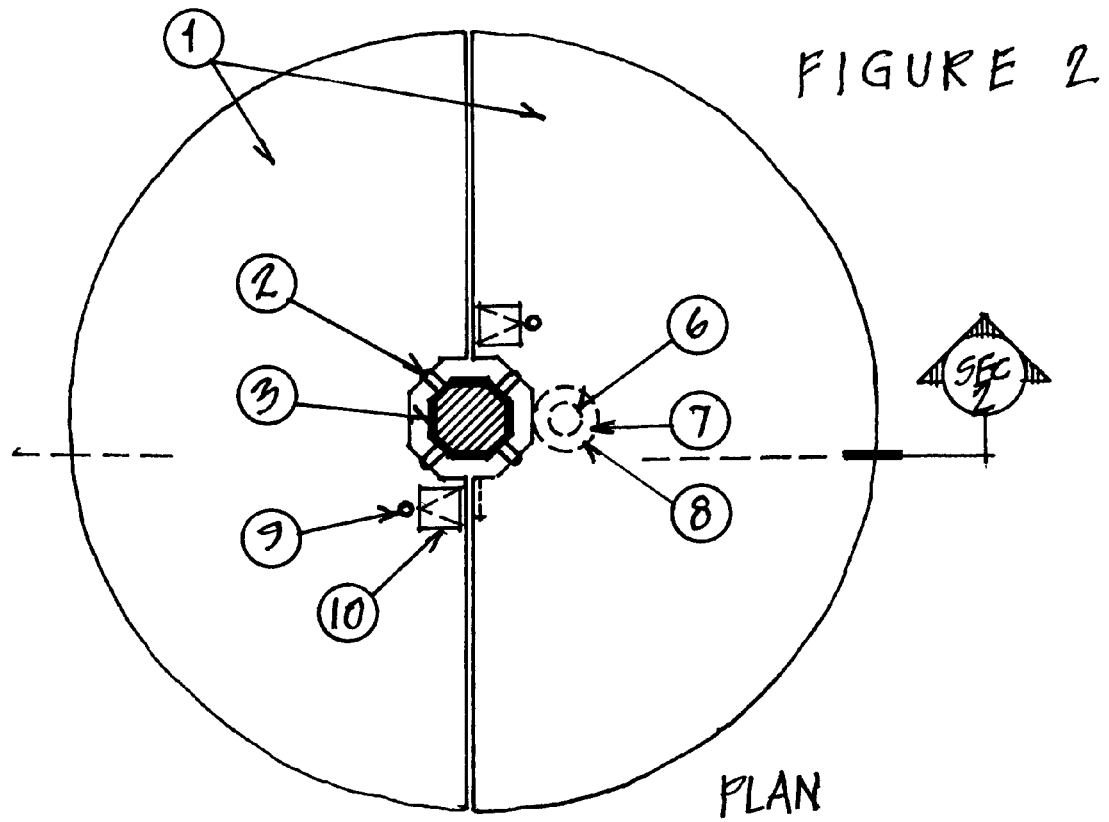
FIGURE 2
PLAN
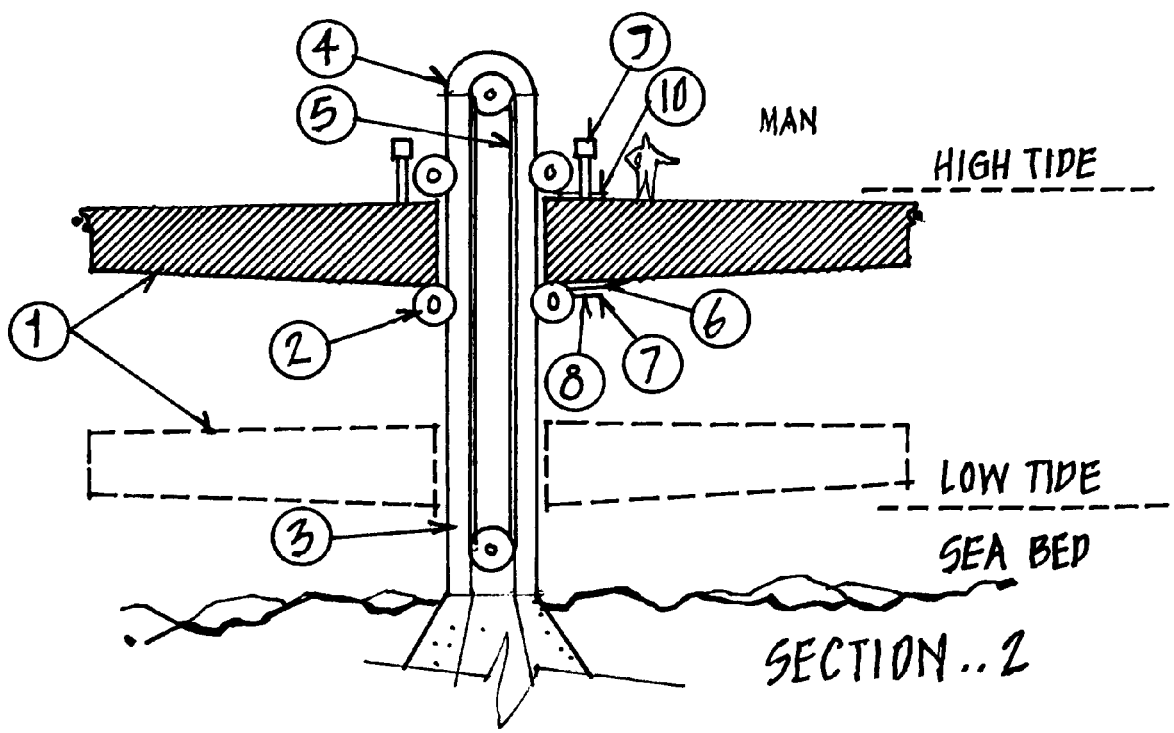
SECTION..2

FREE RENEWABLE ENERGY DESIGNS

There are two types of Free Renewable Energy Designs claimed within this patent. Both of these systems are designed to convert Earth's tidal energy forces directly into electricity through the use of specially designed enclosed modular ocean barges that are structurally interconnected and capable of capturing and releasing large volumes of sea water through water control gate(s). This repetitive exchange of air and sea water, activates bidirectional water turbines located within cylindrical housings at the water control gates and at the internal connections between the modules; and it also drives bidirectional air driven turbines located on air pressure relief vents located on the tops of the modules.

Type A system consists of an assembly of structurally connected modular ocean barges that are permanently suspended between the levels of low and high tide in such a manner that the bottom surface of the assembly is completely above the sea level at lowest tide, and the top surface of the assembly is somewhat above the sea level at highest tide. This system is connected to concrete columns and/or foundations that are permanently embedded into the sea floor; or by means of a system of circular modular reinforced concrete interlocking components resting on foundations or on the sea floor; or by integral extendable adjustable steel columns with bearing pads and an anchoring system. The columns and foundations shall be designed to withstand the total gravitational weight of the system with all possible live load and natural forces as well as the uplifting forces during the buoyancy phase when the modules are completely submerged and filled with air.

Type A system derives all of its electrical energy from bidirectional water turbines that drive electrical generators and by bidirectional air turbines that drive electrical generators. The water turbines are contained within cylindrical housings located adjacent to the watertight control gate(s) and within cylindrical housings at the internal connections between the individual modules at the very bottom of the modules. All turbines are activated by opening the watertight control gate(s) located on the bottom and directly in the center of the central module (or centered within other modules). The entire system is completely emptied at low tide and completely filled at high tide. All turbines shall be engineered and sized based upon the flow of water through the gates and connections; and to the time required for the fill and empty cycles, so that all interconnected modules within individual systems shall be completely full and completely empty at exactly the same time.

The watertight control gate(s) shall have external protective barriers to assure that foreign objects and debris are not drawn into the turbine blades during the fill cycle, and a water direction diverter device to protect the support foundations and the sea bed below from erosive hydrodynamic action. Additionally, the four surrounding underwater support columns around the control gate(s) shall be wrapped with heavy nylon netting to prevent fish and other marine life from being destroyed by the turbine blades. The watertight control gate(s) may be designed to be adjustable to better control the flow of water on both the fill and empty cycles.

The system may also include optional programable repositioning controls so that the vertical module location may be occasionally seasonably adjusted at low tide. Another operating system shall also open and close the turbine gates at the optimal time for maximum power generation on both the fill and empty cycles. An additional fuel cell or battery based system may store electrical energy for on board use between operating cycles. The actual modular ocean container sizes and column spacing shall depend upon the physical location on the Earth, as well as the structural limitations of the construction materials being incorporated in the design of the system and the sea bed conditions; as well as other additional ancillary uses.

Although the drawings submitted with this Patent application focus on a prototype with sixteen square concrete foundations and nine square modular barges with angled corners, the broader system concept extends to and includes much larger structures and systems of man-made synergistic energy islands by simply expanding the grid. These larger systems may also be designed to incorporate wind-power turbines, large solar arrays, and wave action devices installed around the perimeter of the structure. The tops of all support columns may be connected at the top level, well above high tide and storm surge level with structural members to prevent any lateral shifting or movement; a space frame may also be added at the highest level to provide a platform for a solar panel array. The most significant ecological advantages of this type of tidal energy system is that it does not interfere with shoreline ecology or estuary flows, and it allows free passage of ocean life under and around the structure(s). It may also be constructed and maintained at almost any location on the Earth that has large tidal variations and a relatively shallow ocean depth; and are relatively free of heavy ice floes.

Type B system differs from Type A in that it is dynamically secured to octagonal or square support columns by vertical pairs of rolling wheels, and can freely move up and down the columns as programed between low and high tides. This up and down motion uses gravitational kinetic energy and buoyant kinetic energy to mechanically drive electrical generators located on top of the support columns or contained within watertight enclosures on top of or inside the barges.

The energy transfer in Type B system that converts the tidal energy to electrical energy is by mechanical means, taken from a system of continuous loop cables or lines over large rollers or pulleys; or by drive gears that come into direct contact with matching vertical gear tracks attached directly to the face of the columns. Engineered geared transmissions with governors shall provide the correct speed of ascent and descent, and the power transfer to drive the generators. Large rolling rubber bumpers or stainless steel wheels with tires mounted in vertical pairs shall be structurally attached to the barges at typically two pairs per barge and come into continuous dynamic rotating contact with the columns to secure and stabilize the system as it moves up and down the support column(s).

System Type B shall include programable drive mechanism controls that will stop and start the ascent and descent of the barges to maximize power output on both incoming and outgoing tides. These may be adjusted to any time period necessary to maximize the energy production at all phases of the cycles. For maximum power, the barge's descent to the bottom position always shall stay above the top of the sea water on the outgoing tide. On ascending, the barges shall be almost or completely submerged for maximum buoyancy and power as the sea returns to high tide. Additionally, more electrical power shall be generated by internal water driven turbines contained within cylindrical housings and located just inside and adjacent to the barge's watertight control gate, located at the lowest point of the barge; and at all of the internal connections between the barges. These turbines shall be designed to function with water moving into or out of the barge at both the "fill" and "empty" cycles. More electrical power shall be produced by air driven turbines on the pressure relief vents on the tops of the barges. Another optional system using fuel cell technology or batteries, shall store electrical energy on board for use between operational cycles.

Although the attached drawings submitted with this Patent application focus on a small prototype with a single octagonal or square column and a circular modular assembly for my Type B design, the broader system concept extends to and includes much larger structures of man-made islands incorporating square modules similar in plan to those as shown for Type A design; also incorporating wind-power turbines, large solar arrays, and wave action devices located around the perimeter of the structure. A very large scale structure may also include a water distillation plant, an HHO electrolysis factory, and fuel cell technology to convert the electrical power directly into hydrogen to be used as a fuel source.

Characteristics of Type A design verses Type B design are as follows: Type A design is the simplest in that it is permanently locked into position between high tide and low tide levels, and converts Earth's tidal energy into electrical energy by means of bidirectional water and air driven turbines attached to water-tight electrical generators. It will, however, contain a much larger volume of water when full, and therefore the total gravitational mass and the resulting negative uplifting buoyancy will produce substantially more upward and downward forces on the support columns and foundations than will the Type B design. The height of the modules in Type A system will most likely range between 3.5 meters and 10 meters depending on the tidal variation at their specific sites, and the structural limitations of the materials being used. Where tidal changes are very large, water may be captured and released in stages. Type B design is more complex in that it uses gravitational kinetic energy and buoyant kinetic energy to mechanically drive electrical generators, in addition to using bidirectional water and air driven turbines to drive electrical generators. This is a dynamic vertically movable system with more moving components. The height of the modules for the Type B design will be less than that in the Type A design. Therefore, support column and foundation forces would also be less. The height of the modules in the Type B system shall be in the range of 1.5 to 3 meters. They may exceed 3 meters in certain applications. Type A and Type B designs each have certain distinct advantages over the other in different situations.

The construction of the modules shall be of corrosive-resistant or non-corrosive steel such as Corten steel or stainless steel for longevity. Alternately, the steel may be a type commonly used for shipbuilding with protective coverings and an electrical grounding system to minimize corrosive action over time.

The water turbine blades shall be of the newly developed helically shaped type that rotates at twice the velocity of the water flow, regardless of the water direction. This new turbine design claims to capture 35% of the water's potential energy as compared to 20% for conventional turbines, making it far more efficient.

Each modular component shall have a watertight access hatch on the top surface of the barge, with an internal ladder to the bottom surface of the barge.

All barges shall be structurally bolted or welded together at the destination construction site. The circular Type B prototype shall also have a steel tension ring around the external upper perimeter of the adjoined semi-circular modules.

Variations and additions to these tidal man-made islands may serve other various purposes such as Earth friendly ocean based military, commercial and industrial facilities. On the other hand, the most efficient synergistic tidal energy structures may simply incorporate wind-power turbines, perimeter wave action devices and solar panels mounted on a space frame well above storm surge level with little else, sending all electrical power onto shore via undersea cable, to be used to supply the immediate electrical demands with all excess power to be converted directly into hydrogen through electrolysis at an HHO land based facility.

The successful development and refinement of these initial concepts should contribute to solving our Earth's pollution problems. Joining with worldwide use of wind-power turbines, solar energy systems, geo thermal, nuclear power plant development, and future inventions, I sincerely hope that these design ideas to capture Earth's tidal energy will further help all of humanity to move away from our dependence on fossil fuels that is so very destructive to our planet and all life on Earth. It may already be too late. Let's hope not.

Historical context: Throughout history, man has used the motion and weight of water to power all types of his machines. The understanding of buoyancy is is also as old as mankind. These inventions simply marry both of these ancient concepts into devices that capture and release sea water during tidal changes in such a manner as to maximize the total electrical energy output of the system to meet the immediate electrical demands, with all excess electricity redirected to the production and storage of hydrogen for future use as fuel. Hydrogen is a pure and clean energy source! It can and should replace all fossil fuels as soon as possible!

Type A Design Operational Cycle Description Review:

Type A system is permanently locked into position between the highest low tide level and highest high tide level, with the bottom surface of the module at least six inches above the sea level at the highest low tide, and the upper surface of the module about one foot above sea level at the highest high tide. Beginning with the barges being empty at low tide, the watertight gate is sealed closed and kept closed until the sea level rises to the high tide line. The watertight gate is then opened, allowing the sea water to rush inside, activating all 9 water driven, and 9 air driven turbines until the barges are full at the point of highest tide. The watertight gate is then sealed closed, and the captured volume of sea water is held until the sea level returns to the point of lowest tide. Once again, the gates are opened, allowing all of the sea water to spill out, activating all 9 water driven and 9 air driven turbines. As soon as the barges are completely empty, the gate is once again sealed and the process is repeated. Since Earth has slightly more than two tide cycles per day, this produces four power generation cycles per day. Where tidal variations are large, water capture and release may be in stages. This cycle is continued indefinitely.

Type B Design Operational Cycle Description Review:

Type B system is a dynamic system that derives its electrical energy from gravitational kinetic energy and buoyant kinetic energy by means of mechanical motion driving an electrical generator(s) as the system moves up and down the column(s); as well as by the above mentioned water and air driven turbines that are activated during the "fill" and "empty" phases of the cycle. Beginning with the barges being empty at low tide, the gate is sealed closed and the barges are locked into place against the column until the sea level is approaching high tide. The barges are then released and they rise toward the surface producing buoyant kinetic energy driving the mechanical electrical generator(s). Just before the top of the barges reach the surface, the water control gate is opened, allowing sea water to rush inside and fill the barges thus driving the water and air turbines. When full, the gate is sealed closed and the barges are once again locked into place against the column, held suspended in the air until the sea level is approaching low tide. The barges are then released to travel down the column producing gravitational kinetic energy and driving the mechanical electrical generator(s). Just before the bottom of the barges reach the surface of the sea level at low tide, the gates are opened and the turbines are once again reactivated. This cycle is also continued indefinitely.

BRIEF DESCRIPTION OF THE SEVERAL VIEWS OF THE DRAWING

FIG. 1) Combined Plan for Type A and Type B. Section for Type A system.
1) Modular barges suspended between high and low tide. (9)
2) Concrete columns and foundations or modular foundations. (16)
3) Bidirectional water turbines with watertight electrical generators. (9)
4) Hydraulically controlled watertight control gate. (1)
5) External protective grated barrier and water diverter device. (1)
6) Air pressure relief vents with air driven turbines and generators. (9)
7) Watertight access hatches and ladders to bottom of barges. (9)

FIG. 2) Prototype design Plan and Elevation for Type B system.
1) Semicircular modular barges, secured with external tension ring. (2)
2) Vertical pairs of rolling wheels ride against column for stability. (4)
3) Large octagonal steel reinforced concrete column and foundation. (1)
4) Generator(s) and watertight housing. (on column top(s) or on barges)
5) Continuous loop cable/lines, or drive gears to vertical gear tracks. (2)
6) Bidirectional water turbine with watertight electrical generator. (1)
7) Hydraulically controlled watertight control gate. (1)
8) External protective grated barrier and water diverter device. (1)
9) Air pressure relief vents with air driven turbines and generators. (2)
10) Watertight access hatch and ladder to bottom of barge. (2)

Figure 3:
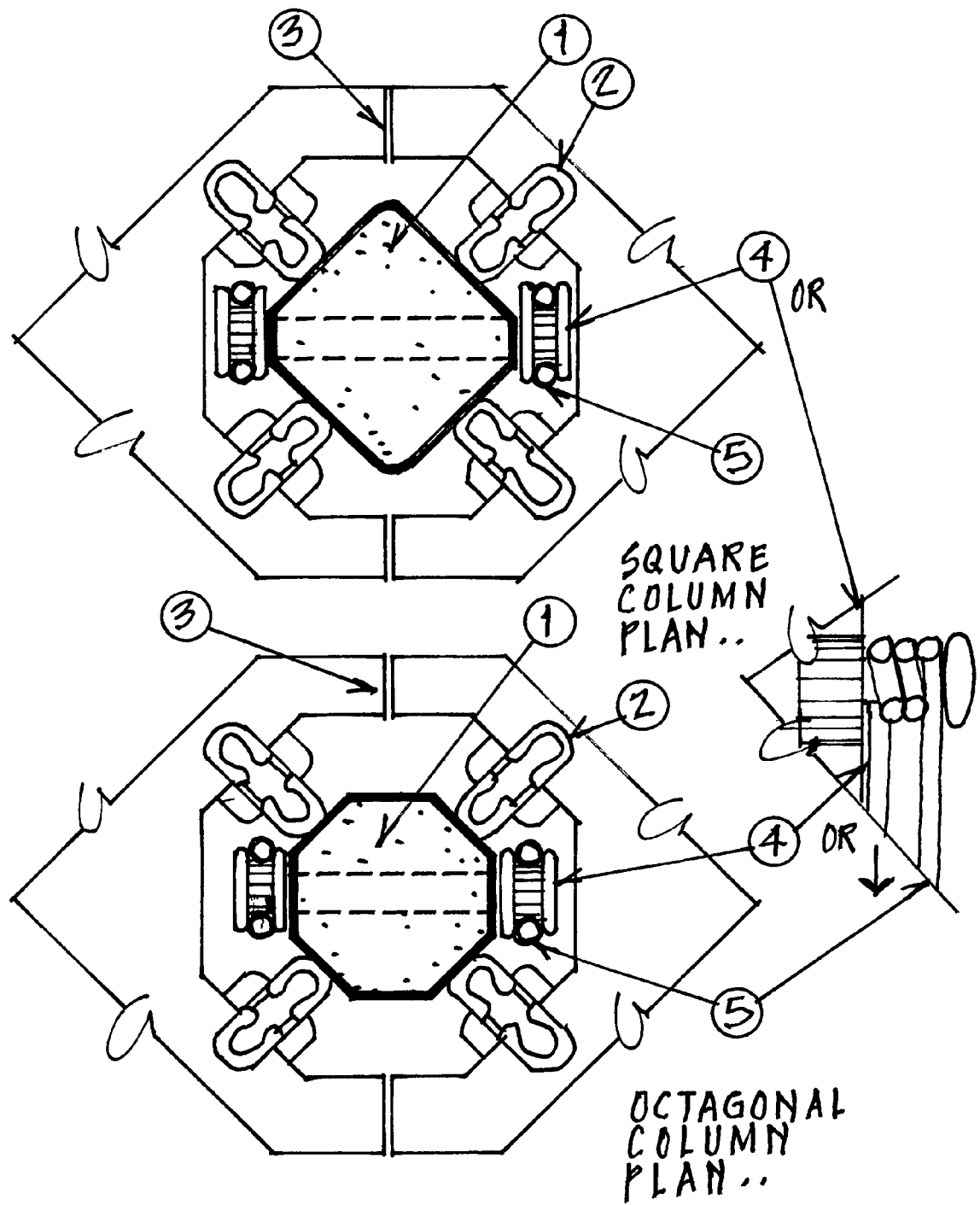
FIG. 3) Central column details for Type B prototype system.
1) Square and octagonal reinforced concrete columns into sea floor. (1)
2) Vertical pairs of rolling wheels ride against column for stability. (4)
3) Barges are structurally secured together with tension ring around. (2)
4) Rollers and/or pulleys at top and bottom both sides typical. (2)
5) Continuous loop cable/lines on both sides drives electrical generator mounted on top of column; or gear driven electrical generator on top of barges with gear track mounted on opposite sides of column. (2)
Figure 4:
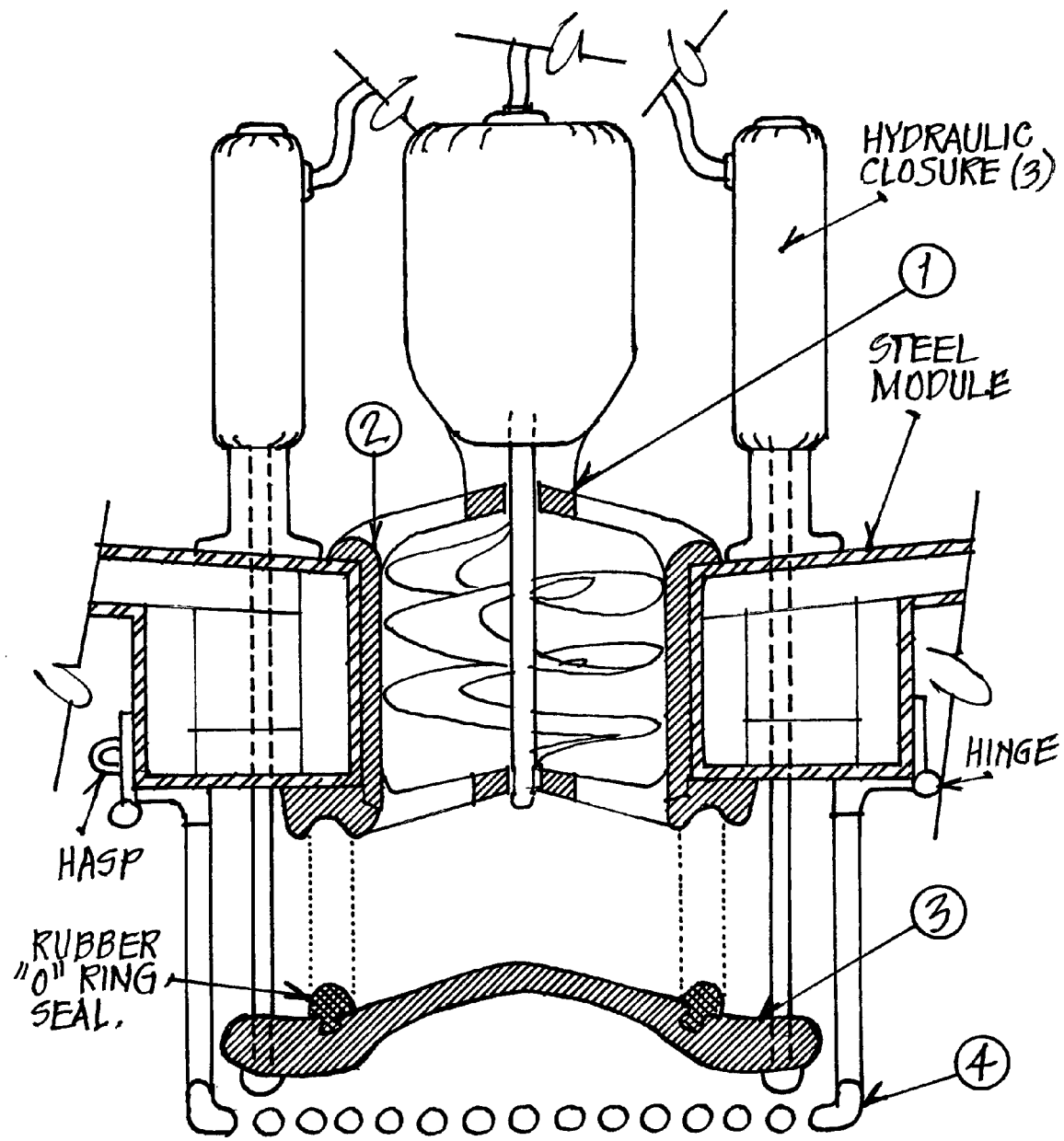
FIG. 4) Water turbine, watertight control gate, and protective barrier details.
1) Bidirectional water turbine and electrical generator. (1)
2) Close tolerance cylindrical housing. (1)
3) Three cylinder hydraulically controlled watertight control gate. (1)
4) External protective grated barrier and water diverter device. (1)

I claim:

1. A system composing a structurally connected enclosed modules ocean barges that are permanently suspended between high and low tide levels for the conversion of tidal potential energy into electrical energy for production of hydrogen through electrolysis at an HHO factory on shore, or on man-made island, said modules include the following elements: an array of support columns and foundations permanently attached to the sea floor, with a modular system of stacking foundation components that sit on foundations; with integral adjustable extendable steel columns and bearing plates and an anchoring system, an adjustable watertight control gate or gates to allow the interconnected modules to capture and release large amounts of sea water, a single, or a series of bidirectional water turbines and watertight generators located adjacent to the control gates and at all water connection points between the adjoining modules a bidirectional air turbine and watertight generator on the air pressure relief vent, an external protective barriers and water flow diverters, a programmable operating system for turbine gate control, an optional system to include a programmable module vertical adjustment control, an additional system to store electrical energy for use between cycles using hydrogen fuel cell technology or storage battery and inverter technology.

* * * * *